United States Patent
Rudolph et al.

(10) Patent No.: US 8,495,315 B1
(45) Date of Patent: Jul. 23, 2013

(54) METHOD AND APPARATUS FOR SUPPORTING COMPOUND DISPOSITION FOR DATA IMAGES

(75) Inventors: Claudia Rudolph, Medina, MN (US); Dennis Parker, Burnsville, MN (US)

(73) Assignee: Symantec Corporation, Mountain View, CA (US)

( * ) Notice: Subject to any disclaimer, the term of this patent is extended or adjusted under 35 U.S.C. 154(b) by 396 days.

(21) Appl. No.: 11/864,945

(22) Filed: Sep. 29, 2007

(51) Int. Cl.
 *G06F 12/16* (2006.01)

(52) U.S. Cl.
 USPC .................................. 711/162; 711/E12.103

(58) Field of Classification Search
 USPC ......................................... 711/162, E12.103
 See application file for complete search history.

(56) References Cited

U.S. PATENT DOCUMENTS

| | | | |
|---|---|---|---|
| 5,758,067 A * | 5/1998 | Makinen et al. ............. 714/54 |
| 6,314,502 B1 * | 11/2001 | Piersol ......................... 711/162 |
| 7,305,418 B2 * | 12/2007 | Benhase et al. ................... 1/1 |
| 7,552,358 B1 * | 6/2009 | Asgar-Deen et al. .......... 714/6 |
| 7,769,722 B1 * | 8/2010 | Bergant et al. ............. 707/681 |
| 2002/0065999 A1 * | 5/2002 | Kikuchi et al. .............. 711/162 |
| 2004/0158676 A1 * | 8/2004 | Kasmirsky et al. .......... 711/117 |
| 2004/0172512 A1 * | 9/2004 | Nakanishi et al. ........... 711/162 |
| 2004/0225697 A1 * | 11/2004 | Asano et al. ................. 707/204 |
| 2004/0260973 A1 * | 12/2004 | Michelman .................... 714/13 |
| 2005/0055520 A1 * | 3/2005 | Kappler ....................... 711/162 |
| 2005/0193236 A1 * | 9/2005 | Stager et al. ................... 714/6 |
| 2005/0210041 A1 * | 9/2005 | Taguchi ...................... 707/100 |
| 2006/0053333 A1 * | 3/2006 | Uhlmann et al. ............... 714/2 |
| 2006/0069889 A1 * | 3/2006 | Nagaya et al. .............. 711/162 |
| 2006/0242489 A1 * | 10/2006 | Brockway et al. ........... 714/718 |
| 2006/0262346 A1 * | 11/2006 | Goto .......................... 358/1.15 |
| 2007/0067586 A1 * | 3/2007 | Mikami ...................... 711/162 |
| 2007/0162359 A1 * | 7/2007 | Gokhale et al. ............... 705/28 |
| 2007/0185879 A1 * | 8/2007 | Roublev et al. .............. 707/10 |
| 2007/0198797 A1 * | 8/2007 | Kavuri et al. ................ 711/165 |
| 2007/0279499 A1 * | 12/2007 | Takeshita .................. 348/231.6 |
| 2008/0005204 A1 * | 1/2008 | Prus et al. ................... 707/205 |
| 2008/0115141 A1 * | 5/2008 | Welingkar et al. ........... 718/104 |
| 2008/0147997 A1 * | 6/2008 | Littlefield et al. ............ 711/161 |
| 2008/0184063 A1 * | 7/2008 | Abdulvahid ..................... 714/6 |
| 2008/0208926 A1 * | 8/2008 | Smoot et al. ................ 707/203 |
| 2008/0256314 A1 * | 10/2008 | Anand et al. ................ 711/162 |
| 2008/0313109 A1 * | 12/2008 | Machulsky et al. ........... 706/12 |

* cited by examiner

*Primary Examiner* — Hal Schnee
(74) *Attorney, Agent, or Firm* — Campbell Stephenson LLP

(57) ABSTRACT

A method and apparatus supporting compound deposition for data images. The method and apparatus comprises configuring a backup process according to a storage plan, wherein the storage plan is defined by destination list, backup properties, and backup policy and rules.

21 Claims, 3 Drawing Sheets

METHOD AND APPARATUS FOR SUPPORTING COMPOUND DISPOSITION FOR DATA IMAGES

BACKGROUND OF THE INVENTION

1. Field of the Invention

The present invention generally relates to computer backup techniques and, more particularly, to a method and apparatus for supporting compound disposition for data images.

2. Description of the Background Art

Enterprise data indexing for subsequent fast searching for compliance and discovery purposes has become important. A primary source of enterprise data is a backup image. Backup is a process used to preserve business continuity by ensuring that important data is imaged and preserved on a regular basis. Moreover, archiving data for compliance, historical research and for legal purposes has grown into an important function. Disaster Recovery imposes another set of requirements for data redundancy, mandating that multiple copies of backup images be stored at sometimes multiple and geographically removed locations.

While societal requirements continue to change, storage technologies continue to evolve. For example, today, the cost of disk has fallen enough to be economically efficient as a temporary store for backup images before copying those images to various long-term storage destinations. However, traditional backup-to-tape processes lack the flexibility, choice, adaptability or accountability for the new storage devices and infrastructure.

Therefore, there is a need in the art for specifying and executing elaborate backup and archive image dispositions that are responsive to media characteristics, triggering events and other conditions that society places on data retention.

SUMMARY OF THE INVENTION

Embodiments of the present invention comprise a method and apparatus for supporting compound deposition for backup images. In one embodiment, the method and apparatus comprise configuring a backup process according to a storage plan, wherein the storage plan is defined by destination list, backup properties, and backup policy and rules.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The term "dispositions" is broadly defined to mean residency, such as, tape, disk, and holographic media. Whereas, the term "copying" is intended to mean replication or transforming (compression, encryption). Copying may be subject to time conditions, such as, deadlines, or arbitrary events.

Figure 1:
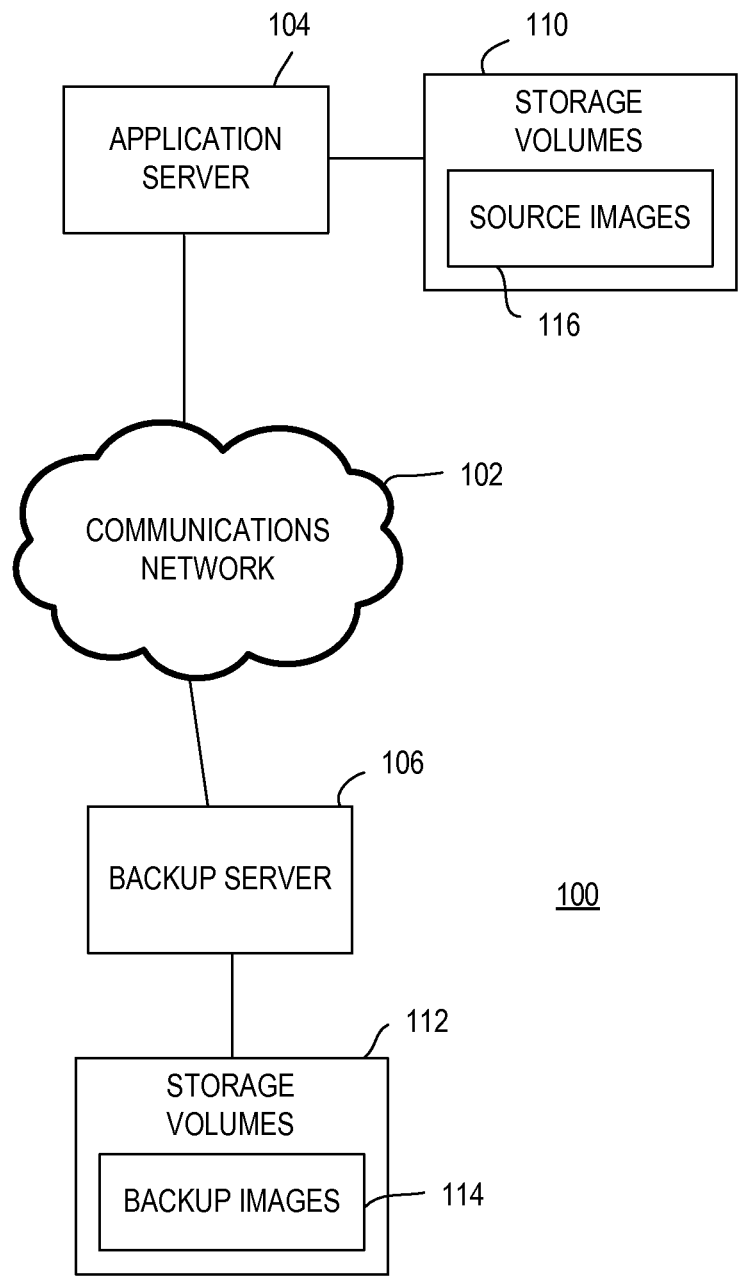
FIG. 1 is a block diagram depicting an exemplary embodiment of a computer network in accordance with one or more aspects of the invention.

FIG. 1 is a block diagram depicting an exemplary embodiment of a computer network 100 in accordance with one or more aspects of the invention. The computer network 100 includes a communications network 102, application server 104 and backup server 106. The computer network 100 may include any number of networks 102, application servers 104 or backup servers 112.

The communications network 102 comprises a communication system that connects computer systems by wire, cable, fiber optic, and/or wireless links facilitated by various types of well-known network elements, such as hubs, switches, routers, and the like. The network 102 may employ various well-known protocols to communicate information.

The application server 104 may include file servers, e-mail servers, terminal servers, and/or the like. The application server 104 may be implemented using any type of computer systems. The application server 104 is configured to manage one or more storage volumes 110. The storage volumes 110 may comprise any type of block-based storage areas and may be implemented using any type of storage system or storage systems, such as, a disk drive system. A disk drive system may include, for example, one or more storage disks, e.g., an array of storage disks or redundant array of storage disks. The storage volumes 110 store data, such as, application programs and program data created and managed by the application server 104 and source images 116. The source images 116 are organized into file systems. A file system refers to the structure and arrangement of files in a storage device. For example, a file system typically includes a hierarchy of directories, each of which may contain one or more files.

The backup server 106 hosts backup services for the application server 104. The backup server 106 is configured to manage one or more storage volumes 112. The storage volumes 112 may be implemented using the same storage system that implements the storage volumes 110, or using a separate storage system (e.g., a separate disk drive system). The storage volumes 112 store backup images 114 that comprise backups of the source images 116. The backup images 114 may include full backups (i.e., a full copy of a source image) and incremental backups (i.e., a backup of file changes with respect to a full backup). The backup server 106 is also coupled to an archive storage system, such as, a tape drive system. The backup server 106 may migrate one or more of the backup images 114 to the archive storage system. The backup server 106 may be implemented using any type of computer systems capable of hosting backup services.

Figure 2:
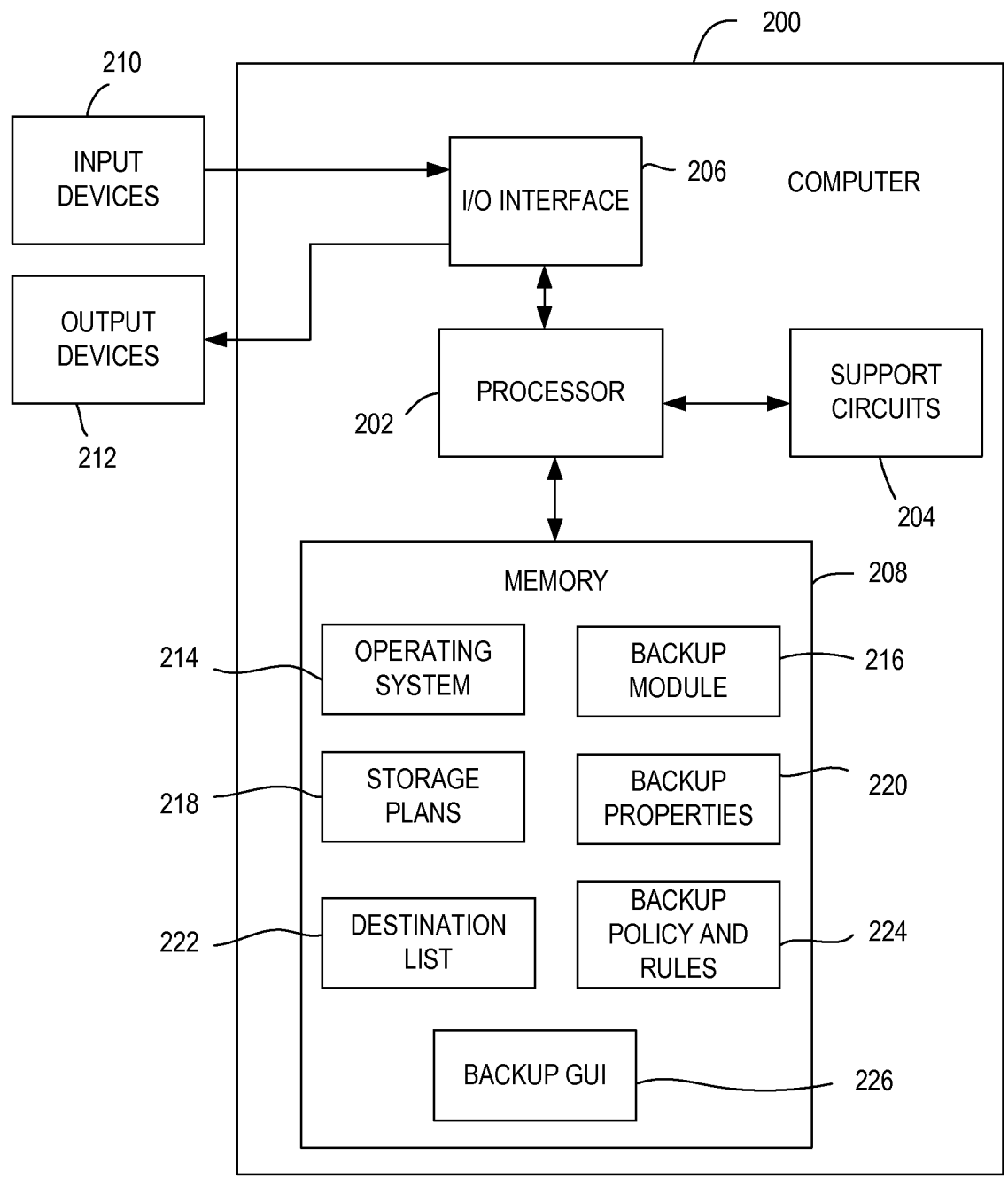
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement the backup server 106 in FIG. 1. The computer system 200 includes a processor 202, various support circuits 204, an I/O interface 206 and a memory 208. The processor 202 may include one or more microprocessors known in the art. The support circuits 204 for the processor 202 include conventional cache, power supplies, clock circuits, data registers, I/O interfaces, and the like. The I/O interface 206 may be directly coupled to the memory 208 or coupled through the processor 202. The I/O interface 206 may also be configured for communication with a network, with various storage devices, as well as, other types of input devices 210 and output devices 212 (e.g., mouse, keyboard, display, etc).

The memory 208 stores processor-executable instructions and/or data that may be executed by and/or used by the processor 202. These processor-executable instructions may comprise hardware, firmware, software, and the like, or some combination thereof. The computer system 200 may be programmed with an operating system 214, which may be OS/2, JAVA VIRTUAL MACHINE, LINUX, SOLARIS, UNIX, WINDOWS, WINDOWS95, WINDOWS98, WINDOWS NT, WINDOWS2000, WINDOWSME, WINDOWS XP, and WINDOWS SERVER among other known platforms. At least a portion of an operating system 214 may be disposed in the memory 208. The memory 208 may include one or more of the following random access memory, read only memory, magneto-resistive read/write memory, optical read/write memory, cache memory, magnetic read/write memory, and the like, as well as signal-bearing media as described below.

Modules having processor-executable instructions that are stored in the memory 208 may include a backup module 216. The backup module 216 is configured to execute backup processes utilizing storage plans 218, backup properties 220, destination list 222 and backup policy and rules 224. The storage plans 218, backup properties 220, destination list 222 and backup policy and rules 224 may reside on any media server.

In one embodiment, a pointer to a storage plan 218 may be used to define the dimensions of the backup process. A dimension may include various storage specifications for backup images, processes, user scripts, and the like. The storage plan 218 includes a list of storage destinations defined in the destination list 222 with accompanying properties defined by the backup properties 220. The backup properties may include retention, de-duplication, failover capabilities and the like.

In another embodiment, backup policy 224 may point to the storage plan 218. In addition, the storage plan 218 may be edited. For example, a user can change the storage unit used for a particular copy of the backup images, or can change the retention scheme for a particular copy. These changes will have an immediate effect on new backups being sent to this storage plan 218.

The storage plan 218 guarantees that copies/backups are successfully complete, even in a case where a failure prevents the completion of a copy/backup. In such a case, the storage plan 218 is persistent in retrying the creation of the copy. For example, the computer may not stop trying to make a copy or finish a backup process. The storage plan may stop trying to make copies in some circumstances, such as, when a user intervenes and cancels the copying process/request, or the longest retention of the backup expires, and the like.

The backup properties 220 may define three types of retentions for the backup images: 1) Fixed retention: this is the traditional, fixed span of time. With a fixed retention of X months, the backup module 216 will delete the copy when X months has passed. 2) Expire After Duplication: Enables a storage device to be used simply as a quick cache for backup jobs. This copy will be deleted as soon as all other copies have been made. 3) Capacity Managed: A copy with Capacity Managed retention will be deleted when more free space is needed on the disk media, to service more incoming backups.

The storage plan 218 may be subject to a number of rules, such as, all copies of a backup image must have been successfully created or else the copy will not be deleted, the storage plan may define an image as "try-to-keep", wherein a user-configured parameter defining a predetermined amount of time in which the backup module will attempt to keep the image available. Such rules allow the image to stay on a disk to provide quick restores for a prescribed amount of time. If other images on the disk have already aged beyond their "try-to-keep" times but this image has not, the expiring images may be deleted before the more current image is deleted. In cases where all images on the disk have not yet aged beyond their try-to-keep date and more free space is needed, the backup module 216 will begin deleting the lowest-ranked images first in accordance with the storage plan 218. In order to allow an image to be deleted, all copies of that image must have been made.

In one embodiment, the user may utilize a backup (Graphical User Interface) GUI 226 to monitor and track the backup process of the backup images for a set of related data. The backup GUI 226 may be interactive and may allow the user to track various storage areas, processes, destination, plans, and the like. The GUI may also allow the user to simultaneously monitor the various aspects of the backup process. The GUI may be stored and/or viewed by any computer in the computer network 100 of FIG. 1.

Figure 3:
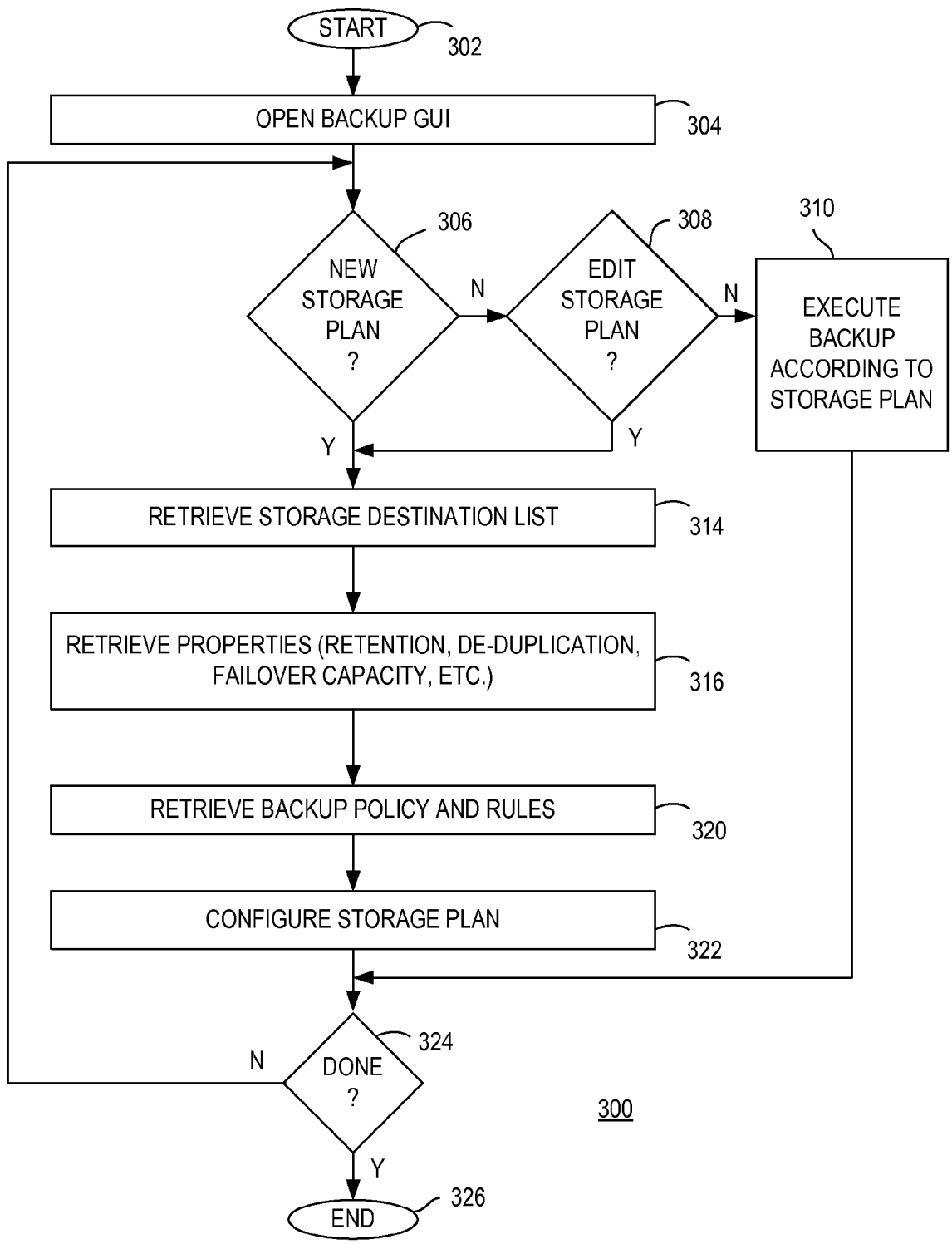
FIG. 3 is a flow diagram depicting an exemplary embodiment of a method for supporting compound disposition for data in backup images in accordance with one or more aspects of the invention.

FIG. 3 is a flow diagram depicting an exemplary embodiment of a method 300 for supporting compound disposition for data in backup images in accordance with one or more embodiments of the invention. The method 300 starts at step 302 and proceeds to step 304. At step 304, a user opens the backup GUI. At step 306, the method 300 queries if a new storage plan is requested. If a new storage plan is not requested, the method 300 proceeds to step 308. At step 308 the method 300 queries if the current storage plan needs to be edited. If the storage plan does not need to be edited, then the method 300 proceeds from step 308 to step 310. At step 310, the backup is executed according to the storage plan and the method 300 proceeds to step 324.

If the storage plan needs to be edited or a new storage plan is needed, the method 300 proceeds to step 314. At step 314, the method 300 retrieves a storage destination list. At step 316, the method 300 retrieves relevant properties, such as, retention, de-duplication, failure capacity, and the like. At step 320, the method 300 retrieve backup policy and rules. At step 322, the method 300 configures the storage plan using the rules policy, properties and destinations list. At step 324, the method 300 queries if the user has completed the plan. If the user is not finished, then the method 300 proceeds to step 306. If the user is finished, the method 300 proceeds to step 326. The method 300 ends at step 326.

While, for the purposes of disclosure there have been shown and described what are considered at present to be illustrative, example embodiments of the present invention; it will be appreciated by those skilled in the art that other uses can be resorted to and changes can be made to the example embodiment details or characteristics without departing from the spirit and scope of the invention. The fact that any illustrative list is present in this disclosure does not intend a limitation on the present invention to those items listed. It is therefore desired that the invention not be limited to these embodiments and it is intended that the appended claims cover all such modifications as fall within this spirit and scope.

While the foregoing is directed to embodiments of the present invention, other and further embodiments of the invention can be devised without departing from the basic scope thereof, and the scope thereof is determined by the claims that follow.

The invention claimed is:

1. A method supporting compound disposition for data images, comprising:
   accessing a storage plan, wherein
      the storage plan identifies a plurality of storage destinations and one or more backup properties for each of the plurality of storage destinations,
      the storage plan applies to a plurality of backup operations across a plurality of volumes, the one or more backup properties comprise a backup retention policy for a backup image,
      the storage plan persistently retries a first backup operation of the plurality of backup operations until a determination is made that a longest retention period associated with the first backup operation has expired, if a failure of the first backup operation occurs during the first backup operation that prevents completion of the first backup operation; and
      the storage plan is stored in a single file or data structure separate from a backup process;
   performing the first backup operation, in response to the accessing the storage plan, wherein the performing complies with the backup retention policy;
   receiving user input modifying at least one of one of the plurality of storage destinations or one of the one or more backup properties of the storage plan for a particular copy of the backup images, wherein
      the modifying the storage plan produces a modified storage plan, and
      the modified storage plan persistently retries a second backup operation of the plurality of backup operations until a determination is made that a longest retention period associated with the second backup operation has expired, if a failure of the second backup operation occurs during the second backup operation that prevents completion of the second backup operation; and
   performing the second backup operation according to the modified storage plan, wherein the second backup operation is performed subsequent to the modifying, and
   the accessing, the performing the first backup operation, the receiving, and the performing the second backup operation are performed by a computing device implementing a backup module.

2. The method of claim 1, wherein the storage plan can be edited according to changes to at least one of destination list, backup properties, backup policy, or backup rules.

3. The method of claim 1, wherein the storage plan is defined by destination list, the one or more backup properties, and backup policy and rules.

4. The method of claim 3, wherein execution of the backup process is viewed by a graphical user interface.

5. The method of claim 1, wherein the storage plan is manipulated using a graphical user interface.

6. The method of claim 3, wherein the one or more backup properties further comprises at least one of de-duplication or failover capabilities.

7. The method of claim 1, wherein
   the persistently retrying the first backup operation is stopped upon detecting user input cancelling the first backup operation.

8. The method of claim 1, further comprising:
   detecting that a backup copy created by the first backup operation has been subsequently copied; and
   deleting the copy in response to the detecting.

9. The method of claim 1, further comprising:
   detecting that additional storage space is needed on a first storage device, wherein
      the first storage device stores a plurality of images associated with the storage plan; and
   deleting at least one of the images in response to the detecting.

10. An apparatus for supporting compound disposition for data images, comprising a backup module configured to:
    access a storage plan, wherein
       the storage plan identifies a plurality of storage destinations and one or more backup properties for each of the plurality of storage destinations,
       the storage plan applies to a plurality of backup operations across a plurality of volumes, the one or more backup properties comprise a backup retention policy for a backup image,
       the storage plan persistently retries a first backup operation of the plurality of backup operations until a determination is made that a longest retention period associated with the first backup operation has expired, if a failure of the first backup operation occurs during the first backup operation that prevents completion of the first backup operation; and
       the storage plan is stored in a single file or data structure separate from a backup process;
    perform the first backup operation, in response to the accessing the storage plan, wherein the performing complies with the backup retention policy;
    receive user input modifying at least one of one of the plurality of storage destinations or one of the one or more backup properties of the storage plan for a particular copy of the backup images, wherein
       receiving the user input modifying the storage plan produces a modified storage plan, and
       the modified storage plan persistently retries a second backup operation of the plurality of backup operations until a determination is made that a longest retention period associated with the second backup operation has expired, if a failure of the second backup operation occurs during the second backup operation that prevents completion of the second backup operation; and
    perform the second backup operation according to the modified storage plan, wherein the second backup operation is performed subsequent to modifying the storage plan, and the backup module is implemented by a computing device.

11. The apparatus of claim 10, wherein the storage plan can be edited according to changes to at least one of destination list, the one or more backup properties, backup policy, or backup rules.

12. The apparatus of claim 10 wherein the storage plan is defined by destination list, the one or more backup properties, and backup policy and rules.

13. The apparatus of claim 12, wherein execution of the backup process is viewed by a graphical user interface.

14. The apparatus of claim 10, wherein the storage plan is manipulated using a graphical user interface.

15. The apparatus of claim 14, wherein the one or more backup properties comprises at least one of de-duplication, or failover capabilities.

16. A system, comprising at least one backup server configured to maintain a plurality of backup images and implement a backup module configured to:
   access a storage plan, wherein
      the storage plan identifies a plurality of storage destinations and one or more backup properties for each of the plurality of storage destinations,
      the storage plan applies to a plurality of backup operations across a plurality of volumes,
      the one or more backup properties comprise a backup retention policy for a backup image,
      the storage plan persistently retries a first backup operation of the plurality of backup operations until a determination is made that a longest retention period associated with the first backup operation has expired, if a failure of the first backup operation occurs during the first backup operation that prevents completion of the first backup operation; and
      the storage plan is stored in a single file or data structure separate from a backup process; and
   perform the first backup operation, in response to the accessing the storage plan, wherein the performing complies with the backup retention policy;
   receive user input modifying at least one of one of the plurality of storage destinations or one of the one or more backup properties of the storage plan for a particular copy of the backup images, wherein
      receiving the user input modifying the storage plan produces a modified storage plan, and
      the modified storage plan persistently retries a second backup operation of the plurality of backup operations until a determination is made that a longest retention period associated with the second backup operation has expired, if a failure of the second backup operation occurs during the second backup operation that prevents completion of the second backup operation; and
   perform the second backup operation according to the modified storage plan, wherein the second backup operation is performed subsequent to modifying the storage plan.

17. The system of claim 16, wherein the storage plan can be edited according to changes to at least one of destination list, the one or more backup properties, backup policy, or backup rules.

18. The system of claim 16, wherein the storage plan is defined by destination list, the one or more backup properties, and backup policy and rules.

19. The system of claim 16, wherein execution of the backup process is viewed by a graphical user interface.

20. The system of claim 16, wherein the storage plan is manipulated by a graphical user interface.

21. The system of claim 18, wherein the one or more backup properties comprises at least one of de-duplication or failover capabilities.

* * * * *